United States Patent [19]
Van Der Gaast

[11] 3,816,986
[45] June 18, 1974

[54] GRASS CATCHER ATTACHMENT FOR A ROTARY TYPE

[76] Inventor: Harry Van Der Gaast, 289 Hibiscus Dr., Miami Beach, Fla. 33139

[22] Filed: Nov. 6, 1972

[21] Appl. No.: 304,299

[52] U.S. Cl............................ 56/202, 15/79, 15/83
[51] Int. Cl............................................. A01d 35/22
[58] Field of Search ............ 56/202, 203, 204, 205, 56/199, 200; 15/79, 83, 84, 85, 86

[56] References Cited
UNITED STATES PATENTS

| | | | |
|---|---|---|---|
| 3,110,998 | 11/1963 | Goldberg et al. | 56/202 |
| 3,461,474 | 8/1969 | McCandless | 15/83 |
| 3,678,665 | 7/1972 | Stanke | 56/205 |
| 3,716,977 | 2/1973 | Jackson | 56/202 |

*Primary Examiner*—Antonio F. Guida

[57] ABSTRACT

An attachment for a rotary type lawn mower comprised generally of a rigid housing providing an open mouth end portion fixed in a circumpositioned attitude about the open end of the discharge chute of the lawn mower, and an arcuate grass transfer chute communicating between the discharge chute of the lawn mower and a grass receiving hopper. The rear end and bottom of the hopper are normally closed by respective doors, interconnected by linkage means, whereby an accumulation of grass in the hopper may be selectively discharged by the operator by means of a remote control such as a rope fixed to the rear door and extending upwardly and rearwardly to the handle of a push-type or self-propelled rotary lawn mower. When applied to a rider-type of rotary lawn mower, direct linkage means from a conveniently located actuating lever to one of the doors is provided.

18 Claims, 9 Drawing Figures

PATENTED JUN 18 1974    3,816,986

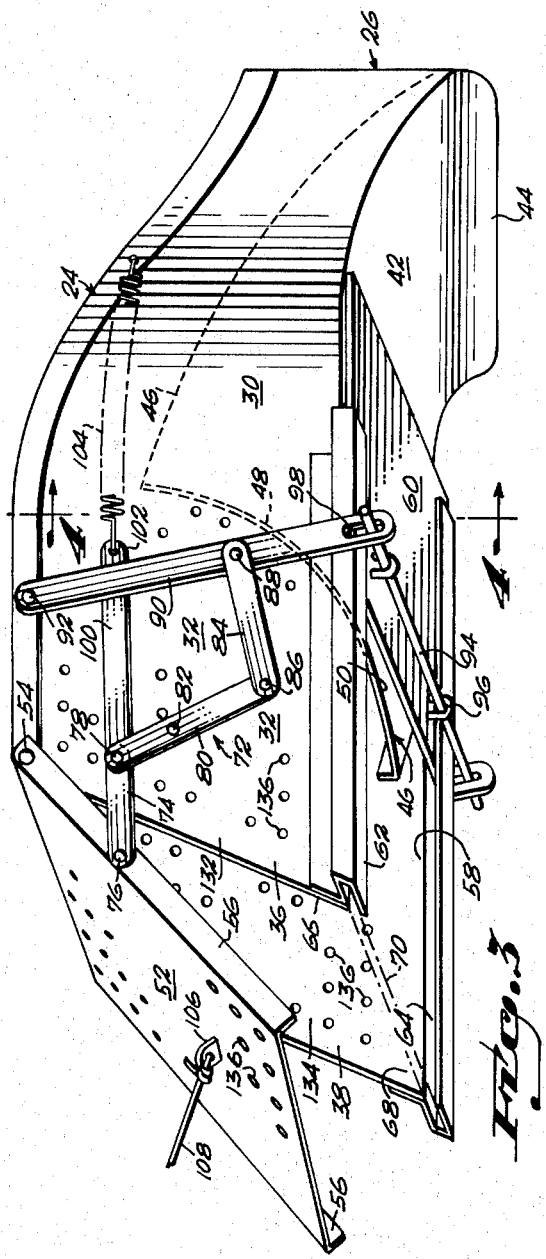

GRASS CATCHER ATTACHMENT FOR A ROTARY TYPE

STATE OF THE PRIOR ART

The most commonly used attachment to collect grass, mowed by a rotary type lawn mower, is comprised of a bag which is positioned in a fixed relation to the discharge chute of the lawn mower. Because of the bulky nature of the mowed grass, the bag must be emptied periodically during the mowing operation. This operation entails, first, detaching the bag from the discharge chute, second, carrying the filled bag, often a substantial distance, to a receptacle or the like to empty the bag and, third, returning to the lawn mower and reattaching the bag thereto.

Many of the bags, now in use, particularly for residential use, hold something in the nature of one-half bushel of grass. The area that can be mowed, per bag full of grass, is quite variable depending on the length of the grass, however, if the lawn is mowed at normal periodic intervals, the area that can be mowed, per bag full of grass, would be something in the nature of twenty-five feet square. For an average residential lot, this results in rather frequent bag detaching, emptying and reattaching operations.

BACKGROUND OF THE PRESENT INVENTION

The attachment for rotary lawn mowers of the present invention provides a different concept whereby said attachment remains fixed to the discharge chute of the lawn mower and the mowed grass collected in the hopper thereof is discharged at selected locations about the lawn as the cutting operation proceeds in an uninterrupted manner until the entire lawn is mowed. The discharge from the hopper is accomplished by the operator by means of a remote control rope or lever, attached to a rear door pivotally attached to the hopper. For a push-type or self-propelled mower, a second door enclosure is provided substantially along the length of the bottom of the hopper and is linked to the rear door in a manner whereby actuation of the remote control rope simultaneously pivots the rear door upwardly and slides the bottom door forwardly. As a result, the grass collected in the hopper is discharged in a semi-compacted mass and is not dragged and spread about even when the discharge operation is performed with the lawn mower in motion.

When applied to a rider-type of rotary lawn mower, the bottom door may be hinged at the lower, forward corners of the hopper and appropriately linked to the rear door. Adjacent to the operators seat is an actuating lever, connected to a slide bar, for simultaneous, selective operation of both doors between their respective open and closed positions.

After the mowing is completed, a receptacle, such as one commonly known as a garden cart, can be moved about the yard and the semi-compacted masses of grass placed therein.

This type of operation saves a substantial amount of time relative to the operation wherein a bag must be periodically removed, manually transported to a receptacle or discharge area, returned to the lawn mower and then reattached thereto.

The present invention also provides a modification to the conventional rotary cutting blade of the lawn mower which cooperates with the attachment by providing substantial suction forces beneath the cutting blade to pick up the blades of mowed grass, and increased blowing forces above the cutting blade resulting in the grass blades being driven into the hopper with added impetus, resulting in a semi-compacted mass therein. A two-fold advantage results, first, more grass is receved in a hopper of a given volumn and the masses of grass are much more easily collected after the mowing operation is completed.

BRIEF DESCRIPTION OF THE DRAWINGS

FIG. 4 is a vertical cross sectional view taken along the line 4—4 of FIG. 3;

FIG. 5 is a top plan view of a typical rotary lawn mower blade with means fixed thereto to create suction forces beneath the blade and increased blowing forces thereabove;

DETAILED DESCRIPTION OF THE DRAWINGS

Figure 1:
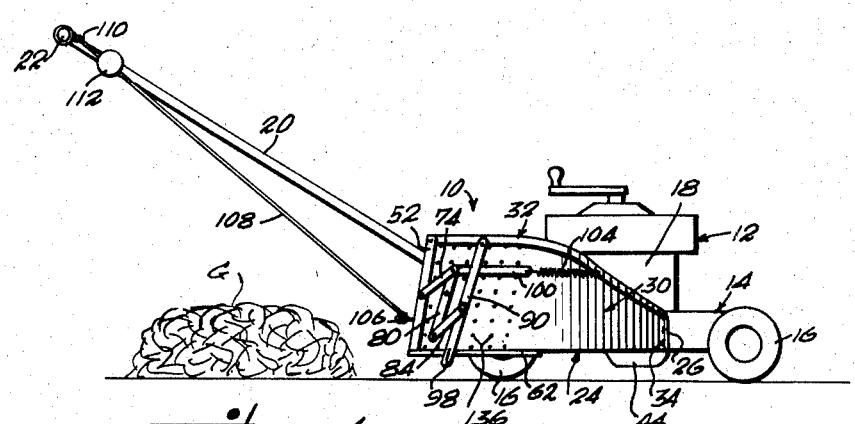
FIG. 1 is a side elevational view of a typical rotary type lawn mower with the grass catcher attachment of the present invention fixed thereto.

With reference to the drawings in which like reference numerals designate like or corresponding parts throughout the various views and with particular reference to FIG. 1, the numeral 10 indicates generally the grass catcher attachment of the present invention in fixed relation to a typical rotary type of lawn mower 12, comprised generally of a main cutter blade housing 14 supported on four wheels 16, drive means 18, and pivotal handle means 20 providing a hand grip portion 22.

The grass catcher attachment generally consists generally of a main housing 24 providing three portions, first, an open mouth front end portion 26 for fixed communical attachment to the end of the conventional discharge chute 28 of the rotary mower blade housing 14, second, an arcuately configurated grass transfer chute portion 30 and, third, a grass collector hopper portion 32.

The open mouth portion 26 is circumpositioned relative to the discharge chute 28 of the mower and fixed thereto as at 34 in any conventional manner. The attachment means 34 may be rivets, spot welding or the like or, preferably, may be of a type to permit removal of the attachment 10 such as bolts and wing nuts or any other type of detachment means. The top of the front end portion 26 may be hinged to the mower discharge port as indicated at 29 in FIG. 2, to permit the grass catcher attachment to be folded over the mower housing for storage purposes.

Figure 3:
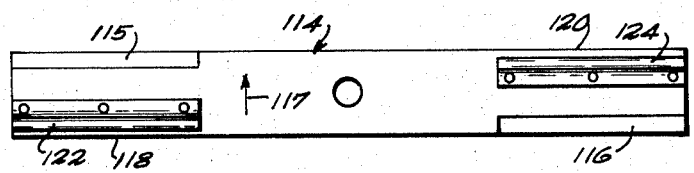
FIG. 3 is an enlarged perspective view of the attachment of FIG. 1, illustrating the operation of the grass discharge doors associated therewith.

With particular reference to FIGS. 3 and 4, the main housing 24 of the attachment 10 is comprised of opposed side walls 36 and 38, top wall 40 and bottom wall 42. The open mouth portion 26 and the transfer chute portion 30 are so enclosed and the open mouth portion 26 preferably includes a downwardly turned lip 44 from the bottom wall 42 to assist in directing grass cuttings from the mower discharge chute 28 into the grass transfer chute 30 of the attachment 10.

With further reference to FIGS. 3 and 4, the transfer chute portion 30 is arcuate as viewed from the top to communicate between the mower discharge chute 28 and the hopper portion 32 which is preferably longitudinally disposed relative to the mower. The arcuate configuration of the transfer chute portion 30 is designed to position the hopper portion 32 outwardly of and closely adjacent to the one rear wheel 16.

The transfer chute portion 30 is preferably provided with a baffle plate 46, fixed therein, extending from the mower discharge chute 28 to the hopper portion 32 to control and direct the stream of grass cuttings flowing therethrough. This baffle plate 46 is longitudinally curved to conform with the arcuate transfer chute portion 30, and is variably curved transversely as at 48 along its length to efficiently control and direct the grass cuttings stream with the least possible resistance and, at the same time, to provide no sharp corners or the like which might result in a build-up of grass cuttings. As illustrated in FIGS. 3 and 4 the end of the baffle plate 46, adjacent the hopper portion 32, is somewhat upturned as at 50 to direct the stream of grass cuttings, emerging from the transfer chute 30, somewhat upwardly into the hopper 32.

The grass collector hopper 32 is provided with a swinging door closure 52 at its rear end. The door 52 is pivotally connected at 54, through the top ends of opposed side flanges 56, to the upper end of the side walls 36 and 38 and is therefore swingable outwardly and upwardly relative to the housing 24.

As best illustrated in FIG. 3, the bottom wall 42 of the housing 24 stops short of the hopper portion 32, providing an open bottom 58 therein. A sliding door closure 60, slidably engaged in opposed side tracks 62 and 64, fixed along the bottom edges of the respective side wall portions 66 and 68 of the hopper 32, serves to normally close the bottom opening 58 as indicated by the dot-dash lines 70.

With particular reference to FIG. 3, the swinging and sliding doors 52 and 60 are interconnected by linkage means 72, effecting simultaneous opening and closing thereof as selectively determined by the operator of the lawn mower 10. The linkage means 72 comprises a first link 74 pivotally connected at 76 and 78 between a door flange 56 and a first end of a fulcrum arm 80, pivoted at 82 intermediate its length to a side wall 36. A second link 84 is pivotally connected at 86 and 88 between the second end of the fulcrum arm 80 and an elongated swinging arm 90 which is, in turn, pivotally connected at its upper end 92 to the side wall 36 adjacent the top edge thereof. The arm 90 extends downwardly, somewhat below the sliding door 60. A transverse rod 94 fixed at 96 to the underside of the sliding door 60 extends through an elongated slot 98 in the lower end of the arm 90.

Figure 2:
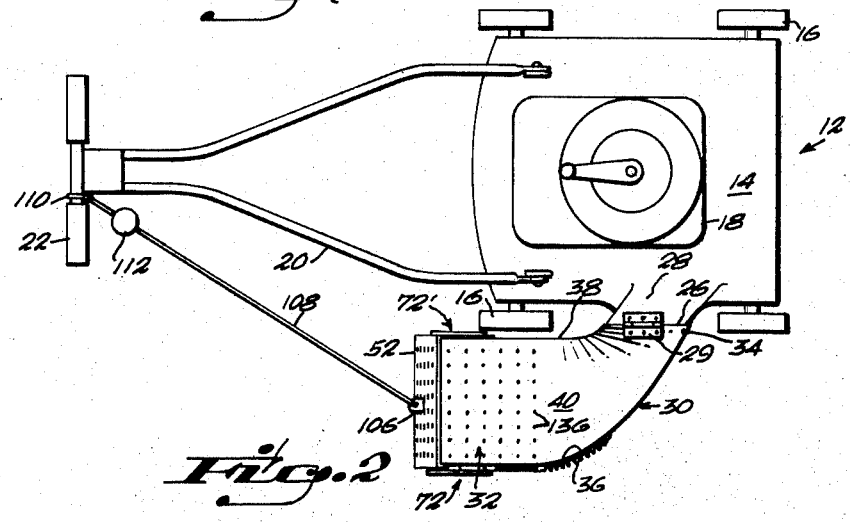
FIG. 2 is a top plan view of the lawn mower and attachment of FIG. 1.

The above description of the linkage means 72 is in the singular as applied to the visible outside of the device in FIG. 3, however, this linkage means is duplicated on the inside of the device as indicated at 72' in FIG. 2, providing a stabilized operation of the two doors 52 and 60.

The outside of the device as viewed in FIG. 3 includes a tension spring door closure means comprised of a forwardly extending link 100 having its end 102 connected to the housing 24 by the tension spring 104.

A lug 106, fixed to and extending outwardly of the swinging door 52 carries one end of a remote control line such as a rope 108, fixed thereto. As illustrated in FIGS. 1 and 2, the rope 108 extends upwardly and rearwardly to a point of attachment 110 to the hand grip portion 22 of the lawn mower handle 20.

A grip means, such as the ball 112, may be fixed to the rope 108 adjacent the hand grip portion 22. In operation, the lawn mower 10 is operated in the conventional manner until a charge of grass cuttings have been collected in the hopper 32. The operator then pulls the rope 108 by means of grip 112, thereby directly opening the rear swinging door 52 and, through the linkage means 72, simultaneously opening the bottom sliding door 60. The charge of grass G (FIG. 1) is dropped downwardly and deposited en masse without being spread or distributed over a substantial area.

Figure 6:
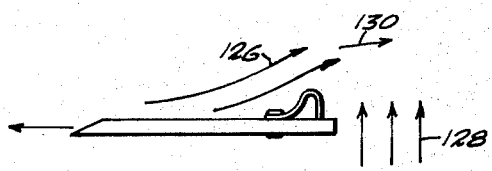
FIG. 6 is an end view of the rotary blade of FIG. 5.

FIGS. 5 and 6 illustrate an attachment to a conventional rotary cutter blade 114 of a lawn mower such as 10 of FIGS. 1 and 2. The rotary cutter blade 114 includes the conventional cutting edges 115 and 116 as determined by the direction of rotation indicated at 117. Fixed adjacent to the respective trailing edges 118 and 120 of the cutter blade 110, the upwardly extending obstructions 122 and 124 are designed to deflect the air upwardly as indicated by the arrows 126. As the cutter blade 110 rotates at a very rapid rate of R.P.M.'s, this upward deflection of the air creates a suction underneath the blade, as indicated by the arrows 128, causing the grass cuttings to rise into the rapidly rotating air, indicated by arrow 130 above the cutter blade 110, to be discharged through the discharge chute 28 into the hopper 32 at a very rapid velocity to cause a semi-compacted accumulation of grass cuttings therein. When the two doors 52 and 60 are opened simultaneously, the grass cuttings accumulation in the hopper 32 is discharged as indicated at G in FIG. 1.

The hopper side wall portions 132 and 134, and the swinging door 52 are provided with a multiplicity of perforations 136 to permit a free flow of air therethrough, thereby preventing the build-up of back pressures to interfere with the air stream depositing the grass cuttings in the hopper 32.

Various changes and modifications can be made in the shape and design of the housing 24 as well as the linkage means 72, door means 52–60 and remote control means 108 without departing from the true spirit of the invention.

Figure 7:
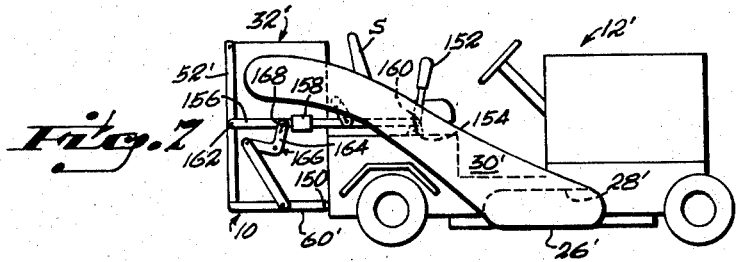
FIG. 7 is a side elevational view of a typical rotary-type riding lawn mower utilizing the grass catcher attachment of the present invention.
Figure 8:
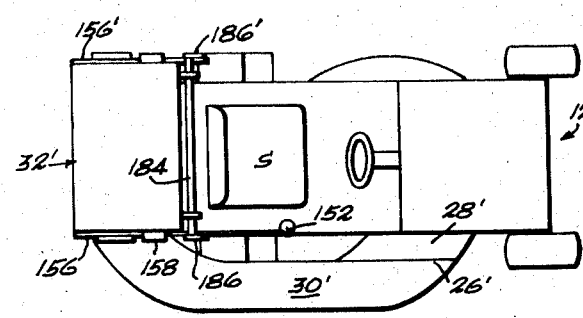
FIG. 8 is a top plan view of the lawn mower and attachment of FIG. 7.
Figure 9:
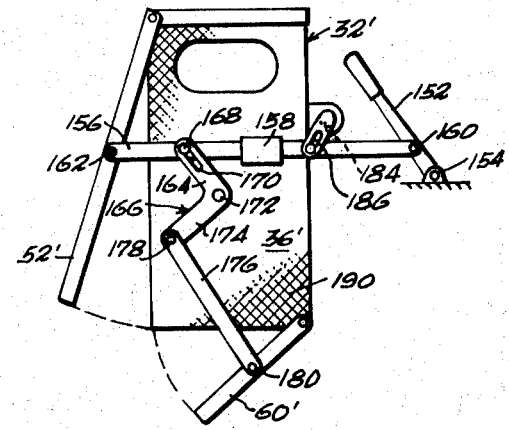
FIG. 9 is an enlarged side view of the hopper as seen in FIG. 7, illustrating the operation of the doors thereof, the grass cuttings transfer chute being removed therefrom.

Referring to FIGS. 7, 8 and 9, a typical rotary-type riding lawn mower 12' is illustrated, fitted with a grass catcher attachment 10' in accordance with the present invention. The attachment 10' includes an open mouth portion 26' fixed relative to the mower discharge chute 28', a grass transfer chute portion 30' and a grass collector hopper 32', preferably mounted across the rear end of the mower 12'. In this form, the device of the present invention functions in the same manner as applied to the push-type or self-propelled mower of FIGS. 1 through 4 and will be described only insofar as the mechanical changes, necessitated by the lower door 60' and the seated position of the operator, are concerned.

With the rear mounted hopper 32', the bottom door 60' is hinged at 150 across the bottom, forward edge of the hopper 32' and opens downwardly as seen in FIG. 9. An operating lever 152 is pivotally attached at 154 to any portion of the mower chassis which will provide a convenience for the operator in the seat S.

A slide bar 156, slidably traversing a guide 158, is pivoted at 160 and 162 between the lever 152 and the rear door 52' whereby selective operation of the lever 152 opens and closes said door 52' relative to the rear hopper opening. Intermediate the length of the slide bar 156, one arm 164 of a bell crank 166 is pivotally connected at 168, through a slot 170, thereto, the bell crank 166 being pivoted at 172 to one side 36' of the hopper 32'. The other arm 174 of the bell crank 166 is pivotally connected to a link 176 at 178, said link 176 having its opposed end pivoted at 180 to the bottom door 60'.

When the operating lever 152 is manually actuated to open the doors 52' and 60', the rear door 52' is opened directly by the slide bar connection thereto. Longitudinal movement of the slide bar 156 transmits a rocking movement to the bell crank 166 which, in turn, opens the bottom door 60' by means of the link 176.

As best illustrated in FIGS. 8 and 9, the movement of the slide bar 156 rotates a transverse control bar 184, extending across the front of hopper 32', by means of a slotted lever 186 connecting therebetween. A similar slotted lever 186' (FIG. 2) transmits longitudinal movement to a slide bar 156', on the opposite side of the hopper 32', to actuate a duplicate bell crank and linkage to the opposite side edge of the bottom door 60' for stabilization purposes.

The side walls and rear door 52' are well vented and may be formed of a heavy screen or mesh material, indicated at 190 in FIG. 9, or they may be perforated in a manner similar to the first form of the invention.

It should also be noted that with some riding mowers, it may be desirable to provide a hopper mounted to the discharge side thereof in a manner similar to the side installation for the push or self-propelled types. With this type of installation it may also be desirable to utilize the bottom sliding door closure means.

What is claimed is:

1. A grass catcher for attachment to a rotary type of lawn mower comprising;
   A. a main rigid housing providing an interior chamber defined by a pair of spaced apart side walls, a top wall and a bottom wall providing,
      1. a first, open mouth portion for fixed communical attachment to the open end portion of the conventional grass discharge chute of the rotary mower blade housing,
      2. a second, grass transfer chute portion extending generally rearwardly from said open mouth portion,
      3. a third, grass collector hopper portion communicating with said transfer chute and providing an open rear end and bottom,
   B. door means, normally in closing relation to said open rear end and bottom;
   C. remote control means to open said door means to discharge an accumulation of grass cuttings in said grass collector hopper at the discretion of the lawn mower operator, said door means comprising a swinging door, pivotally attached to the upper rear end of said hopper, normally in closing relation to said open rear end, and a sliding door, slidably engaged in track means, normally in closing relation to said bottom opening.

2. A grass catcher as defined in claim 1 including interconnection means between said swinging and sliding doors whereby actuation of said swinging door to an open position simultaneously actuates said sliding door to an open position.

3. A grass catcher as defined in claim 2 wherein said interconnecting means comprises, on each side of said main housing, a first link pivotally connecting between said swinging door and a first end of a fulcrum and a second link pivotally connecting between a second end of said fulcrum and a swinging arm, pivotally connected at its upper end to said main housing and including connection means at its lower end to said sliding door.

4. A grass catcher as defined in claim 3 wherein said connection means comprises a transverse rod, fixed to the bottom side of said sliding door, including oppositely extending end portions engaged through elongated slots in the respective lower end portions of said swinging arms.

5. A grass catcher as defined in claim 4 wherein said remote control means comprises a connection means, such as a rope, extending between said swinging door and the hand grip portion of the handle of the lawn mower, whereby the lawn mower operator may simultaneously actuate said swinging and sliding doors to open positions to discharge an accumulation of grass cuttings in said hopper.

6. A grass catcher as defined in claim 3 includng a tension spring connecting between said first end of said fulcrum, on one side of said main housing, and said main housing to close said swinging and sliding doors after actuation of said remote control means.

7. A grass catcher as defined in claim 1 including a multiplicity of perforations in said hopper to permit a free flow of air, generated by the rotary mower blade, therethrough.

8. A grass catcher as defined in claim 1 including a baffle plate, fixed in said grass transfer chute portion, configurated to direct and control a stream of grass cuttings passing therethrough under the influence of a stream of air, generated by the rotary movement of the cutter blade of the rotary lawn mower.

9. A grass catcher as defined in claim 8 wherein the trailing end portion of said baffle plate, adjacent to said hopper, is turned upwardly.

10. A grass catcher as defined in claim 8 including obstruction means, fixed to the top face of the rotary cutting blade of the mower, to deflect the air upwardly to create a suction underneath the cutter blade and to increase the velocity of the air circulated above the cutter blade to drive grass cuttings into said hopper at a velocity whereby the accumulation of grass cuttings in said hopper is in a semi-compacted state.

11. A grass catcher as defined in claim 10 wherein said obstruction means comprises an air deflector, fixed adjacent to each trailing side of the cutter blade, generally in conformity to the cutting edge at the leading side thereof, each of said deflectors providing an upwardly curved leading side portion to direct the flow of air upwardly as the blade is rotated by a conventional drive means.

12. A grass catcher as defined in claim 1 including a hand grip means on said remote control means, adjacent to the hand grip portion of the lawn mower handle.

13. A grass catcher as defined in claim 1 including detachable means to fix said open mouth portion to said grass discharge chute.

14. A grass catcher as defined in claim 13 including hinge means connecting between said open mouth portion and discharge chute whereby said grass catcher is swingable upwardly and over the lawn mower housing when said detachable means are removed.

15. A grass catcher for attachment to a rotary type of lawn mower comprising;
   A. a main rigid housing providing an interior chamber defined by a pair of spaced apart side walls, a top wall and a bottom wall providing,
      1. a first, open mouth portion for fixed communical attachment to the open end portion of the conventional grass discharge chute of the rotary mower blade housing,
      2. a second, grass transfer chute portion extending generally rearwardly from said open mouth portion,
      3. a third, grass collector hopper portion communicating with said transfer chute and providing an open rear end and bottom,
   B. door means, normally in closing relation to said open rear end and bottom;
   C. remote control means to open said door means to discharge an accumulation of grass cuttings in said grass collector hopper at the discretion of the lawn mower operator, said door means comprises a first swinging door, pivotally attached across the upper rear end of said hopper, normally in closing relation to said open rear end, and a second swinging door, pivotally attached across the lower forward end of said hopper normally in closing relation to said bottom opening.

16. A grass catcher as defined in claim 15 including interconnection means between said first and second swinging doors whereby actuation of said first swinging door to an open position simultaneously actuates said second swinging door to an open position.

17. A grass catcher as defined in claim 16 wherein said remote control means comprises an operating lever, strategically, pivotally connected to the mower chassis for easy access by the operator and a slide bar pivotally connected between said operating lever and said interconnection means.

18. A grass catcher as defined in claim 15 including ventilation means in said hopper to permit a free flow of air, generated by the rotary mower blade, therethrough.

* * * * *

UNITED STATES PATENT OFFICE
CERTIFICATE OF CORRECTION

Patent No. 3,816,986　　　　　　　　Dated June 18, 1974

Inventor(s) Harry Van Der Gaast

It is certified that error appears in the above-identified patent and that said Letters Patent are hereby corrected as shown below:

Change Title: "GRASS CATCHER ATTACHMENT FOR A ROTARY TYPE" to --GRASS CATCHER ATTACHMENT FOR A ROTARY TYPE LAWN MOWER--

Signed and sealed this 1st day of October 1974.

(SEAL)
Attest:

McCOY M. GIBSON JR.　　　　　　　　C. MARSHALL DANN
Attesting Officer　　　　　　　　　Commissioner of Patents